(12) United States Patent
Wang et al.

(10) Patent No.: US 11,023,759 B2
(45) Date of Patent: Jun. 1, 2021

(54) METHOD AND DEVICE FOR CORRECTING LICENSE PLATE

(71) Applicant: HANGZHOU HIKVISION DIGITAL TECHNOLOGY CO., LTD., Hangzhou (CN)

(72) Inventors: Hui Wang, Hangzhou (CN); Shifan Zhao, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 89 days.

(21) Appl. No.: 16/348,431

(22) PCT Filed: Oct. 26, 2017

(86) PCT No.: PCT/CN2017/107736
§ 371 (c)(1),
(2) Date: May 8, 2019

(87) PCT Pub. No.: WO2018/086460
PCT Pub. Date: May 17, 2018

(65) Prior Publication Data
US 2019/0272437 A1  Sep. 5, 2019

(30) Foreign Application Priority Data
Nov. 9, 2016 (CN) .......................... 201610986803.8

(51) Int. Cl.
*G06K 9/00* (2006.01)
*G06K 9/03* (2006.01)
(Continued)

(52) U.S. Cl.
CPC ............... *G06K 9/03* (2013.01); *G06K 9/325* (2013.01); *G06K 9/344* (2013.01); *G06K 9/6215* (2013.01);
(Continued)

(58) Field of Classification Search
CPC .......... G06K 9/03; G06K 9/325; G06K 9/344; G06K 9/6215; G06K 9/72; G06K 2209/15; G06K 2209/23; G08G 1/017
See application file for complete search history.

(56) References Cited

U.S. PATENT DOCUMENTS 10,733,471 B1 *  8/2020  Wilbert ................ G06K 9/4671
2016/0300119 A1 * 10/2016  Silva ..................... G06F 16/2228
(Continued)

FOREIGN PATENT DOCUMENTS

CN      105702047      6/1916
CN      104464302      7/1916
(Continued)

OTHER PUBLICATIONS

International Search Report and Written Opinion issued in International Patent Application No. PCT/CN2017/107736, dated Jan. 18, 2018.
(Continued)

*Primary Examiner* — Ping Y Hsieh
(74) *Attorney, Agent, or Firm* — Norton Rose Fulbright US LLP

(57) ABSTRACT

The embodiments of the present application disclose a license plate correction method and apparatus. A to-be-corrected license plate and a corresponding to-be-corrected vehicle-passing record are first determined. Similar license plates of the to-be-corrected license plate are determined. The vehicle-passing record for each similar license plate is matched with the to-be-corrected vehicle-passing record, thereby determining a matching probability of each similar license plate and the to-be-corrected license plate. A similar license plate is determined as a corrected license plate, wherein the matching probability between this similar license plate and the to-be-corrected license plate is highest.
(Continued)

Therefore, a license plate that was incorrectly recognized can be corrected.

20 Claims, 2 Drawing Sheets

(51) Int. Cl.
G06K 9/62 (2006.01)
G08G 1/017 (2006.01)
G06K 9/72 (2006.01)
G06K 9/32 (2006.01)
G06K 9/34 (2006.01)

(52) U.S. Cl.
CPC .............. *G06K 9/72* (2013.01); *G08G 1/017* (2013.01); *G06K 2209/15* (2013.01); *G06K 2209/23* (2013.01)

(56) References Cited

U.S. PATENT DOCUMENTS

2017/0263122 A1* 9/2017 Kamajaya ............... H04W 4/44
2017/0372161 A1* 12/2017 Almeida ............ G06K 9/00785

FOREIGN PATENT DOCUMENTS

| CN | 105118300 | 5/1917 |
| CN | 101630361 | 1/2010 |
| CN | 102722704 | 10/2012 |
| CN | 102881169 | 1/2013 |
| CN | 104392232 | 3/2015 |
| CN | 104464302 | 3/2015 |
| CN | 105117725 | 12/2015 |
| CN | 105118300 | 12/2015 |
| KR | 2014-0118361 | 10/2014 |
| WO | WO 2014193220 | 12/2014 |

OTHER PUBLICATIONS

Zian et al., "Fuzzy Block Port Query Combined with Feature Comparison Method" Forensic Science and Technology, Aug. 15, 2014, pp. 53-54. (Translation not available).

Extended European Search Report issued in counterpart European Application No. 17868799.2, dated Sep. 27, 2019.

Office Action issued in Corresponding Chinese Application No. 201610986803.8, dated Mar. 29, 2021 (English Translation provided).

* cited by examiner

METHOD AND DEVICE FOR CORRECTING LICENSE PLATE

CROSS-REFERENCE TO RELATED APPLICATIONS

The present application is a national phase under 35 U.S.C. § 371 of International Application No. PCT/CN2017/107736, filed Oct. 26, 2017, which claims priority to Chinese patent application No. 201610986803.8 filed with the China National Intellectual Property Administration on Nov. 9, 2016, entitled "License Plate Correction Method and Device", each of which are incorporated herein by reference in their entirety.

TECHNICAL FIELD

The present application relates to the field of data processing technologies, and in particular, to a license plate correction method and apparatus.

BACKGROUND

License plate recognition technology has been widely used. Generally, the recognized license plate of a vehicle and the appearance time, appearance location, shape feature, type and the like of the vehicle are correspondingly stored in a vehicle-passing record for subsequent use. For example, when a major event such as a traffic incident or a robbery event occurs, a suspicious vehicle can be determined by searching the stored vehicle-passing records.

However, due to the influence of the installation position and shooting angle of an acquisition device for image acquisition of license plates, or the environmental effects such as visibility and visible light during image acquisition, a license plate may be incorrectly recognized.

If a license plate is incorrectly recognized, the stored vehicle-passing record will be incorrect. The incorrect vehicle-passing record can bring unpredictable consequences.

SUMMARY

An objective of the embodiments of the present application is to provide a license plate correction method and apparatus for correcting an incorrectly recognized license plate.

To achieve the above objective, an embodiment of the present application discloses a license plate correction method, including:
  determining a to-be-corrected license plate and a to-be-corrected vehicle-passing record for the to-be-corrected license plate;
  determining at least one similar license plate of the to-be-corrected license plate according to stored vehicle-passing records;
  for each similar license plate, determining a to-be-matched vehicle-passing record for the similar license plate, matching the to-be-matched vehicle-passing record with the to-be-corrected vehicle-passing record, and determining a matching probability between the similar license plate and the to-be-corrected license plate according to a matching result; and
  determining a similar license plate as a corrected license plate, wherein the matching probability between this similar license plate and the to-be-corrected license plate is highest.

Optionally, determining a to-be-corrected license plate and a to-be-corrected vehicle-passing record for the license plate may include:
  obtaining recognized first license plates and first vehicle-passing records for the recognized first license plates;
  for each first license plate, determining whether the first license plate is accurately recognized according to a preset rule; and
  if not, determining the first license plate as the to-be-corrected license plate, and determining the first vehicle-passing record for the first license plate as the to-be-corrected vehicle-passing record.

Optionally, determining whether the first license plate is accurately recognized according to a preset rule may include:
  determining whether the first license plate is accurately recognized by at least one of:
  a first determination method: determining whether the first license plate meets a preset naming rule; if the first license plate does not meet the preset naming rule, determining that the first license plate is inaccurately recognized;
  a second determination method: determining whether the first license plate includes an indeterminate character, wherein a recognition result corresponding to the indeterminate character includes at least two candidate characters, and the difference between the probabilities corresponding to the at least two candidate characters is less than a first preset threshold; if the first license plate includes the indeterminate character, determining that the first license plate is inaccurately recognized; and
  a third determination method: determining a vehicle type corresponding to the first license plate; determining whether the determined vehicle type is consistent with a vehicle type contained in the first vehicle-passing record for the first license plate; if the determined vehicle type is not consistent with the vehicle type contained in the first vehicle-passing record for the first license plate, determining that the first license plate is inaccurately recognized.

Optionally, determining whether the first license plate is accurately recognized according to a preset rule may include:
  determining a first appearance time and a first appearance location of a vehicle contained in the first vehicle-passing record for the first license plate;
  determining, according to a preset first time period dividing rule, a first time period corresponding to the first appearance time;
  counting the number of historical first vehicle-passing records of the first license plate during the first time period;
  determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all second vehicle-passing records during the second time period in the first target area; wherein second license plates for the second vehicle-passing records are different from the first license plate, and the first area dividing rule is set according to the second time period dividing rule;

determining, for each of the determined second vehicle-passing records, a similarity between a second license plate for the second vehicle-passing record and the first license plate; and when there is a similarity greater than a third preset threshold, determining that the first license plate is inaccurately recognized.

Optionally, determining whether the first license plate is accurately recognized according to a preset rule may include:

determining a first appearance time and a first appearance location of a vehicle contained in the first vehicle-passing record for the first license plate;

determining, according to a preset first time period dividing rule, a first time period corresponding to the first appearance time;

counting the number of historical first vehicle-passing records of the first license plate during the first time period;

determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all vehicle-passing records during the second time period in the first target area; wherein the first area dividing rule is set according to the second time period dividing rule;

selecting second license plates different from the first license plate in all the determined vehicle-passing records;

for each selected second license plate, determining a similarity between the second license plate and the first license plate; and when there is a similarity greater than a third preset threshold, determining that the first license plate is inaccurately recognized.

Optionally, determining whether the first license plate is accurately recognized according to a preset rule may include:

obtaining a stored historical first vehicle-passing record of the first license plate;

determining whether the first vehicle-passing record for the first license plate matches the historical first vehicle-passing record;

if the first vehicle-passing record for the first license plate does not match the historical first vehicle-passing record, determining that the first license plate is inaccurately recognized.

Optionally, determining whether the first vehicle-passing record for the first license plate matches the historical first vehicle-passing record may include:

determining whether a shape feature of a vehicle contained in the first vehicle-passing record for the first license plate is consistent with a shape feature of a vehicle contained in the historical first vehicle-passing record; and if the shape feature of the vehicle contained in the first vehicle-passing record is not consistent with the shape feature of the vehicle contained in the historical first vehicle-passing record, determining that the first vehicle-passing record for the first license plate does not match the historical first vehicle-passing record;

and/or, determining a first appearance time and a first appearance location of a vehicle contained in the first vehicle-passing record for the first license plate, and a second appearance time and a second appearance location of a vehicle contained in the historical first vehicle-passing record; determining a first time difference between the first appearance time and the second appearance time, and a first distance difference between the first appearance location and the second appearance location; determining whether the quotient of dividing the first distance difference by the first time difference is within a preset interval; and if the quotient is not within the preset interval, determining that the first vehicle-passing record for the first license plate does not match the historical first vehicle-passing record.

Optionally, determining at least one similar license plate of the to-be-corrected license plate according to stored vehicle-passing records may include:

determining a first shape feature contained in the to-be-corrected vehicle-passing record;

determining second shape features contained in stored vehicle-passing records other than the to-be-corrected vehicle-passing record;

searching for a target second shape feature that is identical with the first shape feature in the determined second shape features; and determining a license plate corresponding to the found target second shape feature as a similar license plate of the to-be-corrected license plate.

Optionally, determining at least one similar license plate of the to-be-corrected license plate according to stored vehicle-passing records may include:

determining a second license plate whose similarity with the first license plate is greater than the third preset threshold as a similar license plate of the to-be-corrected license plate.

Optionally, determining at least one similar license plate of the to-be-corrected license plate according to stored vehicle-passing records may include:

determining a first appearance time and a first appearance location of a vehicle contained in the to-be-corrected vehicle-passing record;

determining, according to a preset second time period dividing rule, a second time period corresponding to the first appearance time; determining, according to a preset first area dividing rule, a first target area corresponding to the first appearance location; wherein the first area dividing rule is set according to the second time period dividing rule;

determining, in the stored vehicle-passing records, all vehicle-passing records during the second time period in the first target area;

selecting second license plates different from the to-be-corrected license plate in all the vehicle-passing records; and determining, for each of the second license plates, a similarity between this second license plate and the to-be-corrected license plate, and if the similarity is greater than a third preset threshold, determining this second license plate as a similar license plate of the to-be-corrected license plate.

Optionally, for each similar license plate, determining a to-be-matched vehicle-passing record for the similar license plate may include:

determining a third appearance time and a third appearance location of a vehicle contained in the to-be-corrected vehicle-passing record;

determining, according to a preset third time period dividing rule, a third time period corresponding to the third appearance time;

determining, according to a preset second area dividing rule, a second target area corresponding to the third appearance location; wherein the second area dividing rule is set according to the third time period dividing rule; and for each similar license plate, determining a historical vehicle-passing record of the similar license plate during the third time period in the second target area as the to-be-matched vehicle-passing record for the similar license plate.

Optionally, there are at least two to-be-matched vehicle-passing records for each similar license plate; the step of matching the to-be-matched vehicle-passing record with the to-be-corrected vehicle-passing record and determining a matching probability between the similar license plate and the to-be-corrected license plate according to a matching result may include:

determining a fourth appearance time and a fourth appearance location of a vehicle contained in each to-be-matched vehicle-passing record for the similar license plate;

determining a trajectory corresponding to the similar license plate according to the fourth appearance time and the fourth appearance location of the vehicle contained in each to-be-matched vehicle-passing record;

matching the third appearance time and the third appearance location with the trajectory, and determining a matching probability between the similar license plate and the to-be-corrected license plate according to a matching result.

Optionally, matching the to-be-matched vehicle-passing record with the to-be-corrected vehicle-passing record and determining a matching probability between the similar license plate and the to-be-corrected license plate according to a matching result may include:

determining a fourth appearance time and a fourth appearance location of a vehicle contained in each to-be-matched vehicle-passing record for the similar license plate;

calculating, for each to-be-matched vehicle-passing record, a second time difference between the fourth appearance time contained in the to-be-matched vehicle-passing record and the third appearance time, and a second distance difference between the fourth appearance location contained in the to-be-matched vehicle-passing record and the third appearance location; determining, according to the second time difference and the second distance difference, a matching result of the to-be-matched vehicle-passing record and the to-be-corrected vehicle-passing record; and determining a matching probability between the similar license plate and the to-be-corrected license plate according to the matching result of each to-be-matched vehicle-passing record for the similar license plate and the to-be-corrected vehicle-passing record.

Optionally, matching the to-be-matched vehicle-passing record with the to-be-corrected vehicle-passing record and determining a matching probability between the similar license plate and the to-be-corrected license plate according to a matching result may include:

determining a fourth appearance time and a fourth appearance location of a vehicle contained in each to-be-matched vehicle-passing record for the similar license plate;

calculating, for each to-be-matched vehicle-passing record, a second time difference between the fourth appearance time contained in the to-be-matched vehicle-passing record and the third appearance time; obtaining travel duration data of a vehicle between the fourth appearance location and the third appearance location in historical data; determining a duration probability corresponding to the second time difference according to the obtained travel duration data; determining a matching result of the to-be-matched vehicle-passing record and the to-be-corrected vehicle-passing record according to the duration probability; and determining a matching probability between the similar license plate and the to-be-corrected license plate according to the matching result of each to-be-matched vehicle-passing record for the similar license plate and the to-be-corrected vehicle-passing record.

To achieve the above objective, an embodiment of the present application further discloses a license plate correction apparatus, including:

a first determining module, configured for determining a to-be-corrected license plate and a to-be-corrected vehicle-passing record for the license plate;

a second determining module, configured for determining at least one similar license plate of the to-be-corrected license plate according to stored vehicle-passing records;

a third determining module, configured for, for each similar license plate, determining a to-be-matched vehicle-passing record for the similar license plate;

a fourth determining module, configured for matching the to-be-matched vehicle-passing record with the to-be-corrected vehicle-passing record, and determining a matching probability between the similar license plate and the to-be-corrected license plate according to a matching result; and a fifth determining module, configured for determining a similar license plate as a corrected license plate, wherein the matching probability between this similar license plate and the to-be-corrected license plate is highest.

Optionally, the first determining module may include:

an obtaining sub-module, configured for obtaining recognized first license plates and first vehicle-passing records for the recognized first license plates;

a judging sub-module, configured for, for each first license plate, determining whether the first license plate is accurately recognized according to a preset rule; if not, triggering a first determining sub-module; and the first determining sub-module, configured for determining the first license plate as the to-be-corrected license plate, and determining the first vehicle-passing record for the first license plate as the to-be-corrected vehicle-passing record.

Optionally, the judging sub-module may be configured for:

determining whether the first license plate is accurately recognized by at least one of:

a first determination method: determining whether the first license plate meets a preset naming rule; if the first license plate does not meet the preset naming rule, determining that the first license plate is inaccurately recognized, and triggering the first determining sub-module;

a second determination method: determining whether the first license plate includes an indeterminate character, wherein a recognition result corresponding to the indeterminate character includes at least two candidate characters, and the difference between the probabilities corresponding to the at least two candidate characters is less than a first preset threshold; if the first license plate includes the indeterminate character, determining that the first license plate is inaccurately recognized, and triggering the first determining sub-module; and a third determination method: determining a vehicle type corresponding to the first license plate; determining whether the determined vehicle type is consistent with a vehicle type contained in the first vehicle-passing record for the first license plate; if the determined vehicle type is not consistent with the vehicle type contained in the first vehicle-passing record for the first license plate, determining that the first license plate is inaccurately recognized and triggering the first determining sub-module.

Optionally, the judging sub-module may be configured for:

determining a first appearance time and a first appearance location of a vehicle contained in the first vehicle-passing record for the first license plate;

determining, according to a preset first time period dividing rule, a first time period corresponding to the first appearance time;

counting the number of historical first vehicle-passing records of the first license plate during the first time period;

determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all second vehicle-passing records during the second time period in the first target area; wherein second license plates for the second vehicle-passing records are different from the first license plate, and the first area dividing rule is set according to the second time period dividing rule;

determining, for each of the determined second vehicle-passing records, a similarity between a second license plate for the second vehicle-passing record and the first license plate; and when there is a similarity greater than a third preset threshold, determining that the first license plate is inaccurately recognized.

Optionally, the judging sub-module may be configured for:

determining a first appearance time and a first appearance location of a vehicle contained in the first vehicle-passing record for the first license plate;

determining, according to a preset first time period dividing rule, a first time period corresponding to the first appearance time;

counting the number of historical first vehicle-passing records of the first license plate during the first time period;

determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all vehicle-passing records during the second time period in the first target area; wherein the first area dividing rule is set according to the second time period dividing rule;

selecting second license plates different from the first license plate in all the determined vehicle-passing records;

for each selected second license plate, determining a similarity between the second license plate and the first license plate; and when there is a similarity greater than a third preset threshold, determining that the first license plate is inaccurately recognized.

Optionally, the judging sub-module may include:

an obtaining unit, configured for obtaining, for each first license plate, a stored historical first vehicle-passing record of the first license plate;

a judging unit, configured for determining whether the first vehicle-passing record for the first license plate matches the historical first vehicle-passing record; if the first vehicle-passing record for the first license plate does not match the historical first vehicle-passing record, determining that the first license plate is inaccurately recognized.

Optionally, the judging unit may be configured for:

determining whether a shape feature of a vehicle contained in the first vehicle-passing record for the first license plate is consistent with a shape feature of a vehicle contained in the historical first vehicle-passing record; and if the shape feature of the vehicle contained in the first vehicle-passing record is not consistent with the shape feature of the vehicle contained in the historical first vehicle-passing record, determining that the first vehicle-passing record for the first license plate does not match the historical first vehicle-passing record;

and/or, determining a first appearance time and a first appearance location of a vehicle contained in the first vehicle-passing record for the first license plate, and a second appearance time and a second appearance location of a vehicle contained in the historical first vehicle-passing record; determining a first time difference between the first appearance time and the second appearance time, and a first distance difference between the first appearance location and the second appearance location; determining whether the quotient of dividing the first distance difference by the first time difference is within a preset interval; and if the quotient is not within the preset interval, determining that the first vehicle-passing record for the first license plate does not match the historical first vehicle-passing record.

Optionally, the second determining module may be configured for:

determining a first shape feature contained in the to-be-corrected vehicle-passing record;

determining second shape features contained in stored vehicle-passing records other than the to-be-corrected vehicle-passing record;

searching for a target second shape feature that is identical with the first shape feature in the determined second shape features; and determining a license plate corresponding to the found target second shape feature as a similar license plate of the to-be-corrected license plate.

Optionally, the second determining module may be configured for:
    determining a second license plate whose similarity with the first license plate is greater than the third preset threshold as a similar license plate of the to-be-corrected license plate.

Optionally, the second determining module may be configured for:
    determining a first appearance time and a first appearance location of a vehicle contained in the to-be-corrected vehicle-passing record;
    determining, according to a preset second time period dividing rule, a second time period corresponding to the first appearance time; determining, according to a preset first area dividing rule, a first target area corresponding to the first appearance location; wherein the first area dividing rule is set according to the second time period dividing rule;
    determining, in the stored vehicle-passing records, all vehicle-passing records during the second time period in the first target area;
    selecting second license plates different from the to-be-corrected license plate in all the vehicle-passing records; and
    determining, for each of the second license plates, a similarity between this second license plate and the to-be-corrected license plate, and if the similarity is greater than a third preset threshold, determining this second license plate as a similar license plate of the to-be-corrected license plate.

Optionally, the third determining module may include:
    a second determining sub-module, configured for determining a third appearance time and a third appearance location of a vehicle contained in the to-be-corrected vehicle-passing record;
    a third determining sub-module, configured for determining, according to a preset third time period dividing rule, a third time period corresponding to the third appearance time;
    a fourth determining sub-module, configured for determining, according to a preset second area dividing rule, a second target area corresponding to the third appearance location; wherein the second area dividing rule is set according to the third time period dividing rule; and
    a fifth determining sub-module, configured for, for each similar license plate, determining a historical vehicle-passing record of the similar license plate during the third time period in the second target area as the to-be-matched vehicle-passing record for the similar license plate.

Optionally, there are at least two to-be-matched vehicle-passing records for each similar license plate, and the fourth determining module is configured for:
    determining a fourth appearance time and a fourth appearance location of a vehicle contained in each to-be-matched vehicle-passing record for the similar license plate;
    determining a trajectory corresponding to the similar license plate according to the fourth appearance time and the fourth appearance location of the vehicle contained in each to-be-matched vehicle-passing record; and
    matching the third appearance time and the third appearance location with the trajectory, and determining a matching probability between the similar license plate and the to-be-corrected license plate according to a matching result.

Optionally, the fourth determining module may be configured for:
    determining a fourth appearance time and a fourth appearance location of a vehicle contained in each to-be-matched vehicle-passing record for the similar license plate;
    calculating, for each to-be-matched vehicle-passing record, a second time difference between the fourth appearance time contained in the to-be-matched vehicle-passing record and the third appearance time, and a second distance difference between the fourth appearance location contained in the to-be-matched vehicle-passing record and the third appearance location; determining, according to the second time difference and the second distance difference, a matching result of the to-be-matched vehicle-passing record and the to-be-corrected vehicle-passing record; and
    determining a matching probability between the similar license plate and the to-be-corrected license plate according to the matching result of each to-be-matched vehicle-passing record for the similar license plate and the to-be-corrected vehicle-passing record.

Optionally, the fourth determining module may be configured for:
    determining a fourth appearance time and a fourth appearance location of a vehicle contained in each to-be-matched vehicle-passing record for the similar license plate;
    calculating, for each to-be-matched vehicle-passing record, a second time difference between the fourth appearance time contained in the to-be-matched vehicle-passing record and the third appearance time; obtaining travel duration data of a vehicle between the fourth appearance location and the third appearance location in historical data; determining a duration probability corresponding to the second time difference according to the obtained travel duration data; determining a matching result of the to-be-matched vehicle-passing record and the to-be-corrected vehicle-passing record according to the duration probability; and
    determining a matching probability between the similar license plate and the to-be-corrected license plate according to the matching result of each to-be-matched vehicle-passing record for the similar license plate and the to-be-corrected vehicle-passing record.

To achieve the above objective, an embodiment of the present application further discloses an electronic device, including: a processor and a memory, wherein the memory is used to store an executable program code, and the processor executes a program corresponding to the executable program code by reading the executable program code stored in the memory, so as to perform any of the license plate correction methods described above.

To achieve the above objective, an embodiment of the present application further discloses an executable program code which, when executed, performs any of the license plate correction methods described above.

In order to achieve the above objective, an embodiment of the present application further discloses a computer readable storage medium, which is used for storing an executable program code which, when executed, performs any of the license plate correction methods described above.

In the embodiments of the present application, a to-be-corrected license plate and a corresponding to-be-corrected vehicle-passing record are first determined. Then similar license plates of the to-be-corrected license plate are determined, and a vehicle-passing record for each similar license plate is matched with the to-be-corrected vehicle-passing record, thereby determining a matching probability of each similar license plate and the to-be-corrected license plate. A similar license plate is determined as a corrected license plate, wherein the matching probability between this similar license plate and the to-be-corrected license plate is highest. Therefore, a license plate that was incorrectly recognized is corrected.

Of course, any of the products or methods of the present application does not necessarily achieve all of the advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

In order to solve the above technical problem, the embodiments of the present application provide a license plate correction method and apparatus, which are applicable to various electronic devices such as a computer and a tablet computer, which is not limited thereto. The license plate correction method according to the embodiment of the present application is first described in detail below.

Figure 1:
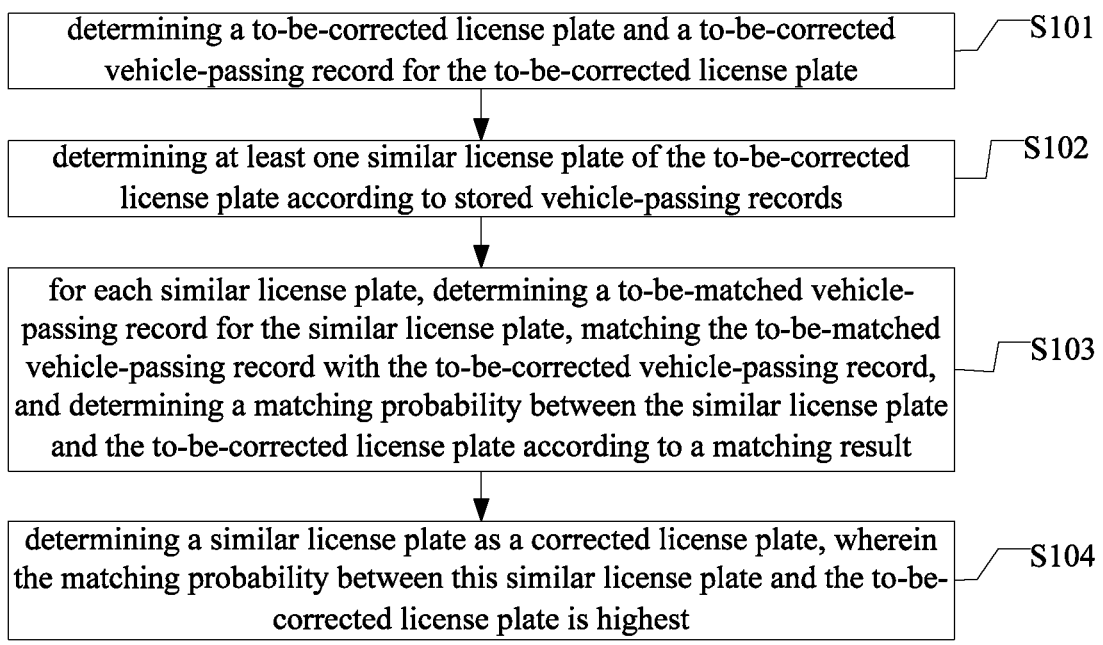
FIG. 1 is a schematic flow chart of a license plate correction method according to an embodiment of the present application.

FIG. 1 is a schematic flowchart of a license plate correction method according to an embodiment of the present application. The method includes S101-S104.

S101: determining a to-be-corrected license plate and a to-be-corrected vehicle-passing record for the to-be-corrected license plate.

A to-be-corrected license plate can be understood as an incorrectly recognized license plate. The to-be-corrected license plate may be determined in various methods. As an implementation, recognized first license plates and corresponding first vehicle-passing records may be obtained. For each first license plate, whether the first license plate is correctly recognized is determined according to a preset rule; if the first license plate is incorrectly recognized, the first license plate is determined as the to-be-corrected license plate, and the first vehicle-passing record for the first license plate is determined as the to-be-corrected vehicle-passing record.

The present solution may determine the to-be-corrected license plate in all the recognized license plates obtained, or may also determine the to-be-corrected license plate in a preset part of the recognized license plates according to actual needs, which is not limited.

Assuming that the to-be-corrected license plate is determined in all the recognized license plates obtained, the first license plate may be any of the recognized license plates obtained. For each recognized license plate (first license plate) obtained, whether the recognized license plate is correctly recognized is determined through multiple methods.

In a first determination method, it is determined whether the first license plate meets a preset naming rule; if not, it is determined that the first license plate is inaccurately recognized.

For example, the preset naming rule may include: the license plate including 7 characters. If a license plate does not include 7 characters, it is determined that the license plate is inaccurately recognized, and the license plate is the to-be-corrected license plate. As another example, the preset naming rule may include: the first two characters of a Shanghai license plate being HU A, HU B, HU C, or HU D. If there is a Shanghai license plate that does not meet the above preset naming rule, for example, the first two characters of the Shanghai license plate is HU E, HU F, or the like, it is determined that the license plate is inaccurately recognized, and the license plate is the to-be-corrected license plate.

In a second determination method, it is determined whether the first license plate includes an indeterminate character; a recognition result corresponding to the indeterminate character includes at least two candidate characters, and the difference between the probabilities of the at least two candidate characters is less than a first preset threshold; if yes, it is determined that the first license plate is inaccurately recognized.

When the license plate is recognized by an existing recognition technology, the recognition result corresponding to each character includes a candidate character and its corresponding probabilities. When there is only one candidate character, its corresponding probability is generally 100%. When there are multiple candidate characters, the sum of the probabilities corresponding to the multiple candidate characters is generally 100%.

For example, assuming that the character "D" in the license plate is recognized, the obtained recognition result includes three candidate characters "D", "O", and "Q". The probability corresponding to "D" is 70%, the probability corresponding to "O" is 20%, and the probability corresponding to "Q" is 10%. This means that the character "D" in the license plate has 70% chance of being "D", has 20% chance of being "O", and has 10% chance of being "Q".

For example, the preset threshold is 10%, and the recognition result corresponding to a character in the license plate includes two candidate characters "Z" and "2". The probability corresponding to "Z" is 53%, and the probability corresponding to "2" is 47%. The difference between the probabilities corresponding to the two candidate characters "Z" and "2" is less than the preset threshold, that is, the difference between the probability that the character in the license plate is "Z" and the probability that the character in the license plate is "2" is smaller. In this case, the character is an indeterminate character.

When a license plate includes an indeterminate character, it is determined that the license plate is inaccurately recognized, and the license plate is the to-be-corrected license plate.

In a third determination method, a vehicle type corresponding to the first license plate is determined, and it is determined whether the determined vehicle type is consistent with a vehicle type contained in the first vehicle-passing record for the first license plate; if not, it is determined that the first license plate is inaccurately recognized.

Generally, a vehicle type can be determined by a license plate. For example, if a license plate includes "Jin E", a vehicle type corresponding to the license plate is a taxi. If the first license plate includes "Jin E", but the vehicle type contained in the first vehicle-passing record for the first license plate is not a taxi, it is determined that the first license plate is inaccurately recognized, and the first license plate is the to-be-corrected license plate.

In a fourth determination method, a first appearance time and a first appearance location of a vehicle contained in the first vehicle-passing record corresponding to the first license plate is determined; a first time period corresponding to the first appearance time is determined according to a preset first time period dividing rule; the number of historical first vehicle-passing records of the first license plate during the first time period is counted; it is determined whether the number is less than a second preset threshold; if yes, a second time period corresponding to the first appearance time is determined according to a preset second time period dividing rule; a first target area corresponding to the first appearance location is determined according to a preset first area dividing rule; all second vehicle-passing records during the second time period in the first target area are determined; wherein second license plates for the second vehicle-passing records are different from the first license plate; the first area dividing rule is set according to the second time period dividing rule; for each determined second vehicle-passing record, a similarity between a second license plate for this second vehicle-passing record and the first license plate is determined; when there is a similarity greater than a third preset threshold, it is determined that the first license plate is inaccurately recognized.

Alternatively, in the fourth determination method, after all the second vehicle-passing records during the second time period in the first target area are determined, second license plates different from the first license plate are selected in the all determined vehicle-passing records; for each selected second license plate, a similarity between the second license plate and the first license plate is determined; when there is a similarity greater than a third preset threshold, it is determined that the first license plate is inaccurately recognized.

For example, the first appearance time of the vehicle contained in the first vehicle-passing record for the first license plate is 10:00 am on Nov. 1, 2016, and the first appearance location is A1. The first time period dividing rule may be set according to actual circumstances. For example, if one day is set as one time period, the first time period corresponding to the first appearance time is Nov. 1, 2016.

The number of historical first vehicle-passing records of the first license plate during the first time period (Nov. 1, 2016) is counted, and it is determined whether the number is less than a second preset threshold. It can be understood that, in general, a vehicle will pass through a plurality of checkpoints in one trip, and vehicle-passing records will be captured at the checkpoints. Therefore, a license plate generally has multiple historical vehicle-passing records during a time period. If the number of historical first vehicle-passing records of the first license plate is small during the first time period, the first license plate may be inaccurately recognized.

It is assumed that the number of historical first vehicle vehicle-passing records is 1, and the second preset threshold is 2, that is, the number is smaller than the second preset threshold. In this case, a second time period corresponding to the first appearance time is determined according to a preset second time period dividing rule. The second time period dividing rule may be set according to actual circumstances, and may be the same as or different from the first time period dividing rule. It is assumed that the second time period dividing rule is that one hour is one time period, then the second time period corresponding to the first appearance time may be 10:00 am to 11:00 am on Nov. 1, 2016, or 9:00 am to 10:00 am on Nov. 1, 2016, or 9:30 am to 10:30 am on Nov. 1, 2016, etc., which is not limited.

A first target area corresponding to the first appearance location A1 is determined according to a preset first area dividing rule. It should be noted that the first area dividing rule is set according to the second time period dividing rule. It can be understood that if the second time period dividing rule is that one hour is one time period, the first area dividing rule may be that places that a vehicle passes through within one hour are taken as one area.

All second vehicle-passing records during the second time period and within the first target area are determined. For convenience of description, vehicle-passing records, other than the first vehicle-passing records, in vehicle-passing records during the second time period and withing the first target area are referred to as the second vehicle-passing records.

The license plates contained in the second vehicle-passing records are referred to as second license plates. The similarity calculation is performed on each second license plate and the first license plate. It can be understood that an incorrectly recognized license plate generally indicates that only a part of characters in the license plate is incorrectly recognized, and the incorrectly recognized license plate and the correct license plate should be similar license plates. During the first time period, if the number of historical first vehicle-passing records of the first license plate is small, the first license plate may be inaccurately recognized. In this case, if a license plate similar to the first license plate appears at a time (the second time period) and a location (the first target area) at which a vehicle corresponding to the first license plate may appear, then the similar license plate may be the correct license plate of the vehicle corresponding to the first license plate.

In other words, when there is a similarity greater than the third preset threshold, it is determined that the first license plate is inaccurately recognized.

In a fifth determined method, a stored historical first vehicle-passing record of the first license plate is obtained; it is determined whether the first vehicle-passing record for the first license plate matches the historical first vehicle-passing record; if not, it is determined that the first license plate is inaccurately recognized.

Specifically, whether the first vehicle-passing record for the first license plate matches the historical first vehicle-passing record may be determined through multiple methods.

For example, it is determined whether a shape feature of a vehicle contained in the first vehicle-passing record for the first license plate is consistent with a shape feature of a vehicle contained in the historical first vehicle-passing record; if not, it is determined that the first vehicle-passing record for the first license plate does not match the historical first vehicle-passing record.

In the embodiment, a shape feature of a vehicle may be contained in the vehicle-passing record. The shape feature of the vehicle may be the color, model, and the like of the vehicle. For example, the shape feature of the vehicle contained in the first vehicle-passing record is a "Black Audi A6", and the shape feature of the vehicle contained in the historical first vehicle-passing record of the first license plate is a "Red Dongfeng Peugeot 308S". The first vehicle-passing record for the first license plate does not match the historical first vehicle-passing record, which indicates that the first license plate is inaccurately recognized, and the first license plate is the to-be-corrected license plate.

It should be noted that, in this embodiment, a plurality of historical first vehicle-passing records of the first license plate may be obtained, and the plurality of historical first vehicle-passing records are respectively matched with the first vehicle-passing record. A ratio threshold may be set. If the ratio of the number of the historical first vehicle-passing records that do not match the first vehicle-passing record to the number of the obtained all historical first vehicle-passing records is greater than the ratio threshold, the first vehicle-passing record for the first license plate does not match with the historical first vehicle-passing records, which indicates that the first license plate is inaccurately recognized, and the first license plate is the to-be-corrected license plate. In this way, the contingency of one match can be avoided.

Alternatively, the method of determining whether the first vehicle-passing record for the first license plate matches the historical first vehicle-passing record may include:
  determining a first appearance time and a first appearance location of a vehicle contained in the first vehicle-passing record for the first license plate, and a second appearance time and a second appearance location of a vehicle contained in the historical first vehicle-passing record;
  determining a first time difference between the first appearance time and the second appearance time, and a first distance difference between the first appearance location and the second appearance location; and
  determining whether the quotient of dividing the first distance difference by the first time difference is within a preset interval; if not, it is determined that the first vehicle-passing record for the first license plate does not match the historical first vehicle-passing record.

It should be noted that the second appearance time of the vehicle contained in the historical first vehicle-passing record in the embodiment is not necessarily later than the first appearance time of the vehicle contained in the first vehicle-passing record. In other word, in the embodiment, a stored vehicle-passing record is referred to as a history vehicle-passing record, which does not mean that the time for storing the historical vehicle-passing record must be later than the time for storing the first vehicle-passing record.

Assume that the first appearance time of the vehicle contained in the first vehicle-passing record is 10:00 am on Nov. 1, 2016, and the first appearance location thereof is A1, and the second appearance time of the vehicle contained in the historical first vehicle-passing record is 10:20 am on Nov. 1, 2016, and the second appearance place thereof is A2. The first time difference between the first appearance time and the second appearance time is determined as 20 minutes, and the first distance difference A2-A1 between the first appearance location and the second appearance location is assumed to be 40 km.

The quotient of dividing the first distance difference by the first time difference, that is, the average speed of the vehicle traveling from A1 to A2, is 40 km/20 minutes=120 km/h. Assume that the preset interval is 10 km/h-90 km/h. The preset interval may be understood as a travel speed of a vehicle under normal circumstances. The quotient of dividing the first distance difference by the first time difference is not in the preset interval, that is, the vehicle cannot travel from A1 to A2 within 20 minutes under normal circumstances. Therefore, the first vehicle-passing record for the first license plate does not match the historical first vehicle-passing record, which indicates that the first license plate is inaccurately recognized, and the first license plate is the to-be-corrected license plate.

It should be noted that, in this embodiment, a plurality of historical first vehicle-passing records of the first license plate may be obtained, and the plurality of historical first vehicle-passing records are respectively matched with the first vehicle-passing record. A ratio threshold may be set. If the ratio of the number of the historical first vehicle-passing records that do not match the first vehicle-passing record to the ratio threshold, then the first vehicle-passing record for the first license plate does not match with the historical first vehicle-passing records, which indicates that the first license plate is inaccurately recognized, and the first license plate is the to-be-corrected license plate. In this way, the contingency of one match can be avoided.

In this embodiment, the foregoing plurality of determined methods may be arbitrarily combined to determine whether the first license plate is accurately recognized. For example, for each first license plate, first it is determined whether this first license plate meets a preset naming rule; if this first license plate meets the preset naming rule, it is determined whether the first license plate includes an indeterminate character; if the first license plate does not include an indeterminate character, a vehicle type corresponding to the first license plate is determined, and it is determined whether the determined vehicle type is consistent with a vehicle type contained in the first vehicle-passing record for the first license plate; if the determined vehicle type is consistent with the vehicle type contained in the first vehicle-passing record, it is determined that the first license plate is accurately recognized.

Alternatively, the different determination methods described above may be adopted for different first license plates.

S102: determining at least one similar license plate of the to-be-corrected license plate according to stored vehicle-passing records.

As an implementation, S102 may include:
  determining a first shape feature contained in the to-be-corrected vehicle-passing record;
  determining each second shape feature contained in stored vehicle-passing records other than the to-be-corrected vehicle-passing record;
  searching for a target second shape feature that is identical with the first shape feature in the determined second shape features;
  determining a license plate corresponding to the found target second shape feature as a similar license plate of the to-be-corrected license plate.

In the implementation, a shape feature of a vehicle may be contained in the vehicle-passing record. The shape feature may be understood as the color, model, and the like of the vehicle. For convenience of description, the shape feature contained in the to-be-corrected vehicle-passing record is referred to as the first shape feature, and the shape feature contained in the stored vehicle-passing record is referred to as the second shape feature.

For example, the first shape feature is a "Red Dongfeng Peugeot 308S". The stored vehicle-passing records are searched for the "Red Dongfeng Peugeot 308S". The search result is used as the target second shape feature. The license plate corresponding to the found target second shape feature is determined as the similar license plate of the to-be-corrected license plate.

It should be noted that, if whether the first license plate is accurately recognized is determined by using the fourth determination method, the second license plate whose similarity with the first license plate is greater than the third preset threshold may be directly determined as the similar license plate of the to-be-corrected license plate.

As an implementation, S102 may include:
  determining a first appearance time and a first appearance location of a vehicle contained in the to-be-corrected vehicle-passing record;
  determining, according to a preset second time period dividing rule, a second time period corresponding to the first appearance time; determining, according to a preset first area dividing rule, a first target area corresponding to the first appearance location; wherein the first area dividing rule is set according to the second time period dividing rule;
  determining, in the stored vehicle-passing records, all vehicle-passing records during the second time period in the first target area;
  selecting second license plates different from the to-be-corrected license plate in the all vehicle-passing records;
  for each second license plate, determining a similarity between the second license plate and the to-be-corrected license plate, and if the similarity is greater than a third preset threshold, determining the second license plate as a similar license plate of the to-be-corrected license plate.

For example, the first appearance time of the vehicle contained in the to-be-corrected vehicle-passing record for the to-be-corrected license plate is 10:00 am on Nov. 1, 2016, and the first appearance location thereof is A1. The second time period corresponding to the first appearance time is determined according to the preset second time period dividing rule. The second time period dividing rule may be set according to actual circumstances. If the second time period dividing rule is that one time period is one hour, then the second time period corresponding to the first appearance time may be 10:00 am to 11:00 am on Nov. 1, 2016, or 9:00 am to 10:00 am on Nov. 1, 2016, or 9:30 am to 10:30 am on Nov. 1, 2016, etc., which is not limited.

A first target area corresponding to the first appearance location A1 is determined according to the preset first area dividing rule. It should be noted that the first area dividing rule is set according to the second time period dividing rule. It can be understood that if the second time period dividing rule is that one time period is one hour, the first area dividing rule may be that places that a vehicle passes through within one hour are taken as one area.

All second vehicle-passing records during the second time period within the first target area are determined. For convenience of description, vehicle-passing records, other than the first vehicle-passing records, in vehicle-passing records during the second time period within the first target area are referred to as second vehicle-passing records.

The license plates contained in the second vehicle-passing records are referred to as second license plates. The similarity calculation is performed on each second license plate and the first license plate. It can be understood that an incorrectly recognized license plate generally indicates that only a part of characters in the license plate is incorrectly recognized, and the incorrectly recognized license plate should be similar to the correct license plate. If a license plate similar to the first license plate appears at a time (the second time period) and a location (the first target area) at which the vehicle corresponding to the first license plate may appear, then the similar license plate may be the correct license plate of the vehicle corresponding to the first license plate.

Therefore, when the similarity between the second license plate and the first license plate is greater than the third preset threshold, the second license plate is determined as a similar license plate of the to-be-corrected license plate.

S103: for each similar license plate, determining a to-be-matched vehicle-passing record for the similar license plate, and matching the to-be-matched vehicle-passing record with the to-be-corrected vehicle-passing record, and determining a matching probability between the similar license plate and the to-be-corrected license plate according to a matching result.

Specifically, the step of, for each similar license plate, determining a to-be-matched vehicle-passing record for the similar license plate may include:
  determining a third appearance time and a third appearance location of a vehicle contained in the to-be-corrected vehicle-passing record;
  determining, according to a preset third time period dividing rule, a third time period corresponding to the third appearance time;
  determining, according to a preset second area dividing rule, a second target area corresponding to the third appearance location; wherein the second area dividing rule is set according to the third time period dividing rule; and
  for each similar license plate, determining a historical vehicle-passing record of the similar license plate during the third time period in the second target area as the to-be-matched vehicle-passing record for the similar license plate.

In this embodiment, for convenience of description, the appearance time and location of a vehicle contained in the first vehicle-passing record are referred to as the first appearance time and the first appearance location, and the appearance time and location of a vehicle contained in the historical first vehicle-passing record are referred to as a second appearance time and a second appearance location, and the appearance time and location of a vehicle contained in the to-be-corrected vehicle-passing record are referred to as a third appearance time and a third appearance location. The first vehicle-passing record may be the to-be-corrected vehicle-passing record, and therefore the first appearance time and the first appearance location may be the same as or different from the third appearance time and the third appearance location. It is assumed here that the third appearance time is 10:00 am on Nov. 1, 2016, and the third appearance place is A1.

The third time period dividing rule may be set according to actual circumstances. The third time period dividing rule may be the same as or different from the first time period dividing rule and the second time period dividing rule. It is assumed here that the third time period dividing rule is that one time period is one hour. The third time period corresponding to the third appearance time may be 10:00 am to 11:00 am on Nov. 1, 2016, or 9:00 am to 10:00 am on Nov. 1, 2016, or 9:30 am to 10:30 am on Nov. 1, 2016, etc. It is assumed here that the third time period is 9:30 am to 10:30 am on Nov. 1, 2016.

A second target area corresponding to the third appearance location is determined according to the preset second area dividing rule. It should be noted that the second area dividing rule is set according to the third time period dividing rule. It can be understood that if the third time period dividing rule is that one time period is one hour. The second area dividing rule may be that places that a vehicle passes through within one hour are taken as one area.

For each similar license plate determined in S102, the historical vehicle-passing record of the similar license plate during the third time period in the second target area is determined as the to-be-matched vehicle-passing record for the similar license plate.

The step of matching the to-be-matched vehicle-passing record and the to-be-corrected vehicle-passing record may be performed in a plurality of ways. As an implementation, when there are at least two to-be-matched vehicle-passing records for a similar license plate, the step of matching the to-be-matched vehicle-passing record and the to-be-corrected vehicle-passing record may include:

determining a fourth appearance time and a fourth appearance location of a vehicle contained in each to-be-matched vehicle-passing record for the similar license plate;

determining a trajectory corresponding to the similar license plate according to the fourth appearance time and the fourth appearance location of the vehicle contained in each to-be-matched vehicle-passing record; and matching the third appearance time and the third appearance location with the trajectory, and determining a matching probability of the similar license plate and the to-be-corrected license plate according to a matching result.

The appearance time and location of a vehicle contained in the to-be-matched vehicle-passing record are referred to as the fourth appearance time and the fourth appearance location. For example, there are three to-be-matched vehicle-passing records for a certain similar license plate. The fourth appearance time of a vehicle contained in the first to-be-matched vehicle-passing record is 9:50 am, Nov. 1, 2016 and the fourth appearance location thereof is A3. The fourth appearance time of a vehicle contained in the second to-be-matched vehicle-passing record is 10:10 am on Nov. 1, 2016, and the fourth appearance location thereof is A4. The fourth appearance time of a vehicle contained the third to-be-matched vehicle-passing record is 10:20 am on Nov. 1, 2016 and the fourth appearance location thereof is A5. The three vehicle-passing records can constitute the trajectory of the vehicle, that is, the trajectory corresponding to the similar license plate: 9:50 am on Nov. 1, 2016, A3—10:10 am on Nov. 1, 2016, A4—10:20 am on Nov. 1, 2016, A5.

The matching of the third appearance time and the third appearance location (10:00 am on Nov. 1, 2016, A1) with the trajectory means calculating, according to the trajectory, the probability that the vehicle corresponding to the similar license plate appeared at A1 at 10:00 am on Nov. 1, 2016. Specifically, the probability is calculated by a probability algorithm. For example, the probability may be calculated according to a normal distribution curve. This probability can be understood as a matching probability between the similar license plate and the to-be-corrected license plate.

As another implementation, the step of matching the to-be-matched vehicle-passing record and the to-be-corrected vehicle-passing record may include:

determining a fourth appearance time and a fourth appearance location of a vehicle contained in each to-be-matched vehicle-passing record for the similar license plate;

calculating, for each to-be-matched vehicle-passing record, a second time difference between the fourth appearance time contained in the to-be-matched vehicle-passing record and the third appearance time, and a second distance difference between the fourth appearance location contained in the to-be-matched vehicle-passing record and the third appearance location; determining, according to the second time difference and the second distance difference, a matching result of the to-be-matched vehicle-passing record and the to-be-corrected vehicle-passing record; and determining a matching probability between the similar license plate and the to-be-corrected license plate according to the matching result of each to-be-matched vehicle-passing record for the similar license plate and the to-be-corrected vehicle-passing record.

In an embodiment, there is only one to-be-matched vehichle-passing record for the similar license plate.

Assume that the fourth appearance time of the vehicle contained in the to-be-matched vehicle-passing record is 09:50 am on Nov. 1, 2016, and the fourth appearance location thereof is A3. The second time difference between the fourth appearance time, which is 09:50 am on Nov. 1, 2016 and the third appearance time, which is 10:00 am on Nov. 1, 2016 is determined as 10 minutes, and the second distance difference between the fourth appearance location A3 and the third appearance location A1 is assumed to be 10 km.

The quotient of dividing the second distance difference by the second time difference, that is, the average speed of the vehicle traveling from A3 to A1, is 10 km/10 minutes=60 km/h. Under normal circumstances, the travel speed of a vehicle can be 60 km/h. That is, under normal circumstances, the vehicle can travel from A3 to A1 within 10 minutes. Therefore, the to-be-matched vehicle-passing record matches the to-be-corrected vehicle-passing record.

Since the similar license plate only corresponds to one to-be-matched vehicle-passing record, if the to-be-matched vehicle-passing record matches the to-be-corrected vehicle-passing record, the matching probability of the similar license plate and the to-be-corrected license plate is 100%. If the to-be-matched vehicle-passing record does not match the to-be-corrected vehicle-passing record, the matching probability of the similar license plate and the to-be-corrected license plate is 0%.

Similarly, when there are at least two to-be-matched vehicle-passing records for the similar license plate, each of the to-be-matched vehicle-passing records can be matched with the to-be-corrected vehicle-passing record, and the matching probability of the similar license plate and the to-be-corrected license plate are determined according to each matching result.

Assume that there are three to-be-matched vehicle-passing records for the similar license plate. If the two of the to-be-matched vehicle-passing records match the to-be-corrected license plate, it can be determined that the matching probability of the similar license plate and the to-be-corrected license plate is 66%.

As an implementation, the step of matching the to-be-matched vehicle-passing record and the to-be-corrected vehicle-passing record may include:

- determining a fourth appearance time and a fourth appearance location of a vehicle contained in each to-be-matched vehicle-passing record for the similar license plate;
- calculating, for each to-be-matched vehicle-passing record, a second time difference between the fourth appearance time contained in the to-be-matched vehicle-passing record and the third appearance time; obtaining travel duration data of a vehicle between the fourth appearance location and the third appearance location in historical data; determining a duration probability corresponding to the second time difference according to the obtained travel duration data; determining a matching result of the to-be-matched vehicle-passing record and the to-be-corrected vehicle-passing record according to the duration probability; and
- determining a matching probability between the similar license plate and the to-be-corrected license plate according to the matching result of each to-be-matched vehicle-passing record for the similar license plate and the to-be-corrected vehicle-passing record.

In an embodiment, a similar license plate corresponds to only one to-be-matched record.

Assume that the third appearance time is 10:00 am on Nov. 1, 2016, and the third appearance location is A1. Assume that the fourth appearance time of the vehicle contained in the vehicle-passing record to be matched is 9:50 am on Nov. 1, 2016, and the fourth appearance location is A3. The second time difference between the fourth appearance time and the third appearance time is 10 minutes.

The travel duration data of the vehicle between A3 and A1 is obtained in the historical data. Specifically, the appearance time of the same vehicle at each checkpoint can be stored in advance, so that the travel duration data of the same vehicle between A3 and A1 can be obtained from the stored historical data. Alternatively, the historical vehicle-passing records captured at A3 and A1 may be obtained, and multiple vehicle-passing records for the same license plate may be found in the obtained historical vehicle-passing records, so that the travel duration data of the same vehicle between A3 and A1 may be obtained.

Based on the obtained travel duration data, it is possible to determine the distribution of the travel duration of the vehicle between A3 and A1 under normal circumstances. Based on the distribution, the probability (the duration probability) that the vehicle travels from A3 to A1 within 10 minutes can be determined.

The first scheme may be adopted. That is, when the duration probability is greater than a preset threshold, the to-be-matched vehicle-passing record matches the to-be-corrected vehicle-passing record. Since the similar license plate only corresponds to one to-be-matched vehicle-passing record, if the to-be-matched vehicle-passing record matches the to-be-corrected vehicle-passing record, the matching probability of the similar license plate and the to-be-corrected license plate is 100%. If the to-be-matched vehicle-passing record does not match the to-be-corrected vehicle-passing record, the matching probability of the similar license plate and the to-be-corrected license plate is 0%.

Alternatively, the second scheme may be adopted. That is, the duration probability is used as a matching result of the to-be-matched vehicle-passing record and the to-be-corrected vehicle-passing record. Since the similar license plate only corresponds to one to-be-matched vehicle-passing record, the duration probability is the matching probability of the similar license plate and the to-be-corrected license plate.

Similarly, when there are at least two to-be-matched vehicle-passing records for the similar license plate, each of the to-be-matched vehicle-passing records can be matched with the to-be-corrected vehicle-passing record. The matching probability of the similar license plate and the to-be-corrected license plate is determined according to matching results.

The above first scheme is adopted. Assume that there are three to-be-matched vehicle-passing records for the similar license plate. If the two of the to-be-matched vehicle-passing records match the to-be-corrected license plate, the matching probability between the similar license plate and the to-be-corrected license plate can be determined to be 66%.

The above second scheme is adopted. Assume that there are three to-be-matched vehicle-passing records for the similar license plate. The matching result (corresponding duration probability) of the first to-be-matched vehicle-passing record and the to-be-corrected vehicle-passing record is 80%. The matching result (corresponding duration probability) of the second to-be-matched vehicle-passing record and the to-be-corrected vehicle-passing record is 70%. The matching result (corresponding duration probability) of the third to-be-matched vehicle-passing record and the to-be-corrected vehicle-passing record is 60%. The minimum duration probability may be determined as the matching probability of the similar license plate and the to-be-corrected license plate. Alternatively, the average of the three duration probabilities may be determined as the matching probability of the similar license plate and the to-be-corrected license plate. This is not specifically limited.

S104: determining a similar license plate as a corrected license plate, wherein the matching probability between this similar license plate and the to-be-corrected license plate is highest.

In the embodiment of the present application shown in FIG. 1, a to-be-corrected license plate and a corresponding to-be-corrected vehicle-passing record are first determined. Then similar license plates of the to-be-corrected license plate are determined, and a vehicle-passing record for each similar license plate is matched with the to-be-corrected vehicle-passing record, thereby determining a matching probability of each similar license plate and the to-be-corrected license plate. A similar license plate is determined as a corrected license plate, wherein the matching probability between this similar license plate and the to-be-corrected license plate is highest. Therefore, a license plate that was incorrectly recognized is corrected.

Corresponding to the above method embodiment, an embodiment of the present application further provides a license plate correction apparatus.

Figure 2:
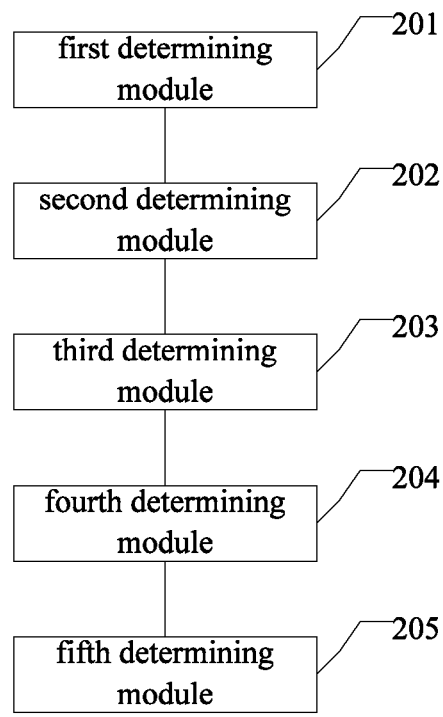
FIG. 2 is a schematic structural diagram of a license plate correction apparatus according to an embodiment of the present application.

FIG. 2 is a schematic structural diagram of a license plate correction apparatus according to an embodiment of the present application, including:

- a first determining module 201, configured for determining a to-be-corrected license plate and a to-be-corrected vehicle-passing record for the license plate;
- a second determining module 202, configured for determining at least one similar license plate of the to-be-corrected license plate according to stored vehicle-passing records;
- a third determining module 203, configured for, for each similar license plate, determining a to-be-matched vehicle-passing record for the similar license plate;

a fourth determining module 204, configured for matching the to-be-matched vehicle-passing record with the to-be-corrected vehicle-passing record, and determining a matching probability between the similar license plate and the to-be-corrected license plate according to a matching result; and a fifth determining module 205, configured for determining a similar license plate as a corrected license plate, wherein the matching probability between this similar license plate and the to-be-corrected license plate is highest.

In this embodiment, the first determining module 201 may include an obtaining sub-module, a judging sub-module and a first determining sub-module (not shown in the figure).

The obtaining sub-module is configured for obtaining recognized first license plates and first vehicle-passing records for the recognized first license plates.

The judging sub-module is configured for, for each first license plate, determining whether the first license plate is accurately recognized according to a preset rule; if not, triggering the first determining sub-module.

The first determining sub-module is configured for determining the first license plate as the to-be-corrected license plate, and determining the first vehicle-passing record for the first license plate as the to-be-corrected vehicle-passing record.

In this embodiment, the judging sub-module may be specifically configured for:

determining whether the first license plate is accurately recognized by at least one of:

a first determination method: determining whether the first license plate meets a preset naming rule; if the first license plate does not meet the preset naming rule, determining that the first license plate is inaccurately recognized, and triggering the first determining sub-module;

a second determination method: determining whether the first license plate includes an indeterminate character, wherein a recognition result corresponding to the indeterminate character includes at least two candidate characters, and the difference between the probabilities corresponding to the at least two candidate characters is less than a first preset threshold; if the first license plate includes the indeterminate character, determining that the first license plate is inaccurately recognized, and triggering the first determining sub-module; and a third determination method: determining a vehicle type corresponding to the first license plate; determining whether the determined vehicle type is consistent with a vehicle type contained in the first vehicle-passing record for the first license plate; if the determined vehicle type is not consistent with the vehicle type contained in the first vehicle-passing record for the first license plate, determining that the first license plate is inaccurately recognized and triggering the first determining sub-module.

In this embodiment, the judging sub-module may be specifically configured for:

for each first license plate, determining a first appearance time and a first appearance location of a vehicle contained in the first vehicle-passing record for the first license plate;

determining, according to a preset first time period dividing rule, a first time period corresponding to the first appearance time;

counting the number of historical first vehicle-passing records of the first license plate during the first time period;

determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all second vehicle-passing records during the second time period in the first target area; wherein second license plates for the second vehicle-passing records are different from the first license plate, and the first area dividing rule is set according to the second time period dividing rule;

determining, for each of the determined second vehicle-passing records, a similarity between a second license plate for the second vehicle-passing record and the first license plate; and when there is a similarity greater than a third preset threshold, determining that the first license plate is inaccurately recognized.

As an implementation, the judging sub-module may be specifically configured for:

determining a first appearance time and a first appearance location of a vehicle contained in the first vehicle-passing record for the first license plate;

determining, according to a preset first time period dividing rule, a first time period corresponding to the first appearance time;

counting the number of historical first vehicle-passing records of the first license plate during the first time period;

determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all vehicle-passing records during the second time period in the first target area; wherein the first area dividing rule is set according to the second time period dividing rule;

selecting second license plates different from the first license plate in all the determined vehicle-passing records;

for each selected second license plate, determining a similarity between the second license plate and the first license plate; and when there is a similarity greater than a third preset threshold, determining that the first license plate is inaccurately recognized.

In this embodiment, the judging sub-module may include:

an obtaining unit, configured for obtaining, for each first license plate, a stored historical first vehicle-passing record of the first license plate;

a judging unit, configured for determining whether the first vehicle-passing record for the first license plate matches the historical first vehicle-passing record; if the first vehicle-passing record for the first license plate does not match the historical first vehicle-passing record, determining that the first license plate is inaccurately recognized.

In this embodiment, the judging unit may be specifically configured for:

determining whether a shape feature of a vehicle contained in the first vehicle-passing record for the first license plate is consistent with a shape feature of a vehicle contained in the historical first vehicle-passing record; and if the shape feature of the vehicle contained in the first vehicle-passing record is not consistent with the shape feature of the vehicle contained in the historical first vehicle-passing record, determining that the first vehicle-passing record for the first license plate does not match the historical first vehicle-passing record;

and/or, determining a first appearance time and a first appearance location of a vehicle contained in the first vehicle-passing record for the first license plate, and a second appearance time and a second appearance location of a vehicle contained in the historical first vehicle-passing record; determining a first time difference between the first appearance time and the second appearance time, and a first distance difference between the first appearance location and the second appearance location; determining whether the quotient of dividing the first distance difference by the first time difference is within a preset interval; and if the quotient is not within the preset interval, determining that the first vehicle-passing record for the first license plate does not match the historical first vehicle-passing record.

In this embodiment, the second determining module 202 may be specifically configured for:

determining a first shape feature contained in the to-be-corrected vehicle-passing record;

determining second shape features contained in stored vehicle-passing records other than the to-be-corrected vehicle-passing record;

searching for a target second shape feature that is identical with the first shape feature in the determined second shape features; and determining a license plate corresponding to the found target second shape feature as a similar license plate of the to-be-corrected license plate.

In this embodiment, the second determining module 202 may be specifically configured for:

determining a second license plate whose similarity with the first license plate is greater than the third preset threshold as a similar license plate of the to-be-corrected license plate.

As an implementation, the second determining module 202 may be specifically configured for:

determining a first appearance time and a first appearance location of a vehicle contained in the to-be-corrected vehicle-passing record;

determining, according to a preset second time period dividing rule, a second time period corresponding to the first appearance time; determining, according to a preset first area dividing rule, a first target area corresponding to the first appearance location; wherein the first area dividing rule is set according to the second time period dividing rule;

determining, in the stored vehicle-passing records, all vehicle-passing records during the second time period in the first target area;

selecting second license plates different from the to-be-corrected license plate in all the vehicle-passing records; and determining, for each of the second license plates, a similarity between this second license plate and the to-be-corrected license plate, and if the similarity is greater than a third preset threshold, determining this second license plate as a similar license plate of the to-be-corrected license plate.

In this embodiment, the third determining module 203 includes:

a second determining sub-module, configured for determining a third appearance time and a third appearance location of a vehicle contained in the to-be-corrected vehicle-passing record;

a third determining sub-module, configured for determining, according to a preset third time period dividing rule, a third time period corresponding to the third appearance time;

a fourth determining sub-module, configured for determining, according to a preset second area dividing rule, a second target area corresponding to the third appearance location; wherein the second area dividing rule is set according to the third time period dividing rule; and a fifth determining sub-module, configured for, for each similar license plate, determining a historical vehicle-passing record of the similar license plate during the third time period in the second target area as the to-be-matched vehicle-passing record for the similar license plate.

In this embodiment, there are at least two to-be-matched vehicle-passing records for each similar license plate, and the fourth determining module 204 may be configured for:

determining a fourth appearance time and a fourth appearance location of a vehicle contained in each to-be-matched vehicle-passing record for the similar license plate;

determining a trajectory corresponding to the similar license plate according to the fourth appearance time and the fourth appearance location of the vehicle contained in each to-be-matched vehicle-passing record; and matching the third appearance time and the third appearance location with the trajectory, and determining a matching probability between the similar license plate and the to-be-corrected license plate according to a matching result.

In this embodiment, the fourth determining module 204 may be specifically configured for:

determining a fourth appearance time and a fourth appearance location of a vehicle contained in each to-be-matched vehicle-passing record for the similar license plate;

calculating, for each to-be-matched vehicle-passing record, a second time difference between the fourth appearance time contained in the to-be-matched vehicle-passing record and the third appearance time, and a second distance difference between the fourth appearance location contained in the to-be-matched vehicle-passing record and the third appearance location; determining, according to the second time difference and the second distance difference, a matching result of the to-be-matched vehicle-passing record and the to-be-corrected vehicle-passing record; and determining a matching probability between the similar license plate and the to-be-corrected license plate according to the matching result of each to-be-matched vehicle-passing record for the similar license plate and the to-be-corrected vehicle-passing record.

In this embodiment, the fourth determining module 204 may be specifically configured for:

determining a fourth appearance time and a fourth appearance location of a vehicle contained in each to-be-matched vehicle-passing record for the similar license plate;

calculating, for each to-be-matched vehicle-passing record, a second time difference between the fourth appearance time contained in the to-be-matched vehicle-passing record and the third appearance time; obtaining travel duration data of a vehicle between the fourth appearance location and the third appearance location in historical data; determining a duration probability corresponding to the second time difference according to the obtained travel duration data; determining a matching result of the to-be-matched vehicle-passing record and the to-be-corrected vehicle-passing record according to the duration probability; and determining a matching probability between the similar license plate and the to-be-corrected license plate according to the matching result of each to-be-matched vehicle-passing record for the similar license plate and the to-be-corrected vehicle-passing record.

In the embodiment of the present application shown in FIG. 2, a to-be-corrected license plate and a corresponding to-be-corrected vehicle-passing record are first determined. Then similar license plates of the to-be-corrected license plate are determined, and a vehicle-passing record for each similar license plate is matched with the to-be-corrected vehicle-passing record, thereby determining a matching probability of each similar license plate and the to-be-corrected license plate. A similar license plate is determined as a corrected license plate, wherein the matching probability between this similar license plate and the to-be-corrected license plate is highest. Therefore, a license plate that was incorrectly recognized is corrected.

Figure 3:
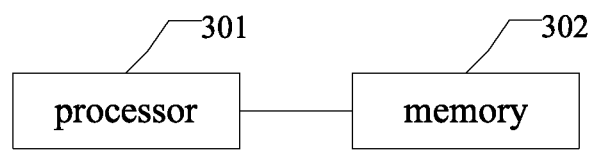
FIG. 3 is a schematic structural diagram of an electronic device provided by an embodiment of the present disclosure

An embodiment of the present application further provides an electronic device, as shown in FIG. 3. The electronic device includes: a processor 301 and a memory 302, wherein the memory 302 is used to store an executable program code, and the processor 301 executes a program corresponding to the executable program code by reading the executable program code stored in the memory 302, so as to perform any of the license plate correction methods described above.

An embodiment of the present application further provides an executable program code which, when executed, performs any of the license plate correction methods described above.

An embodiment of the present application further provides a computer readable storage medium, which is used for storing an executable program code which, when executed, performs any of the license plate correction methods described above.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an" do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the license plate correction apparatus shown in FIG. 2, the embodiment of the electronic device shown in FIG. 3, and the above-described embodiment of the executable program code and the above embodiment of computer readable storage medium are described briefly, since they are substantially similar to the embodiment of the license plate correction method shown in FIG. 1, and the related contents can refer to the description of the embodiment of the license plate correction method shown in FIG. 1.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A license plate correction method, wherein the method comprises:

determining a to-be-corrected license plate and a to-be-corrected vehicle-passing record for the to-be-corrected license plate, wherein the to-be corrected license plate is a license plate that is not accurately recognized;

determining at least one similar license plate of the to-be-corrected license plate according to stored vehicle-passing records;

for each similar license plate, determining a to-be-matched vehicle-passing record for the similar license plate, matching the to-be-matched vehicle-passing record with the to-be-corrected vehicle-passing record, and determining a matching probability between the similar license plate and the to-be-corrected license plate according to a matching result; and determining a similar license plate as a corrected license plate, wherein the matching probability between this similar license plate and the to-be-corrected license plate is highest.

2. The method according to claim 1, wherein determining a to-be-corrected license plate and a to-be-corrected vehicle-passing record for the license plate comprises:

obtaining recognized first license plates and first vehicle-passing records for the recognized first license plates;

for each first license plate, determining whether the first license plate is accurately recognized according to a preset rule; and if not, determining the first license plate as the to-be-corrected license plate, and determining the first vehicle-passing record for the first license plate as the to-be-corrected vehicle-passing record.

3. The method according to claim 2, wherein determining whether the first license plate is accurately recognized according to a preset rule comprises:

determining whether the first license plate is accurately recognized by at least one of:
a first determination method: determining whether the first license plate meets a preset naming rule; if the first license plate does not meet the preset naming rule, determining that the first license plate is inaccurately recognized;
a second determination method: determining whether the first license plate comprises an indeterminate character, wherein a recognition result corresponding to the indeterminate character comprises at least two candidate characters, and the difference between the probabilities corresponding to the at least two candidate characters is less than a first preset threshold; if the first license plate comprises the indeterminate character, determining that the first license plate is inaccurately recognized; and
a third determination method: determining a vehicle type corresponding to the first license plate; determining whether the determined vehicle type is consistent with a vehicle type contained in the first vehicle-passing record for the first license plate; if the determined vehicle type is not consistent with the vehicle type contained in the first vehicle-passing record for the first license plate, determining that the first license plate is inaccurately recognized.

4. The method according to claim 2, wherein, determining whether the first license plate is accurately recognized according to a preset rule comprises:
determining a first appearance time and a first appearance location of a vehicle contained in the first vehicle-passing record for the first license plate;
determining, according to a preset first time period dividing rule, a first time period corresponding to the first appearance time;
counting the number of historical first vehicle-passing records of the first license plate during the first time period;
determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all second vehicle-passing records during the second time period in the first target area; wherein second license plates for the second vehicle-passing records are different from the first license plate, and the first area dividing rule is set according to the second time period dividing rule;
determining, for each of the determined second vehicle-passing records, a similarity between a second license plate for the second vehicle-passing record and the first license plate; and
when there is a similarity greater than a third preset threshold, determining that the first license plate is inaccurately recognized.

5. The method according to claim 4, wherein, determining at least one similar license plate of the to-be-corrected license plate according to stored vehicle-passing records comprises:
determining a second license plate whose similarity with the first license plate is greater than the third preset threshold as a similar license plate of the to-be-corrected license plate.

6. The method according to claim 2, wherein determining whether the first license plate is accurately recognized according to a preset rule comprises:
determining a first appearance time and a first appearance location of a vehicle contained in the first vehicle-passing record for the first license plate;
determining, according to a preset first time period dividing rule, a first time period corresponding to the first appearance time;
counting the number of historical first vehicle-passing records of the first license plate during the first time period;
determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all vehicle-passing records during the second time period in the first target area; wherein the first area dividing rule is set according to the second time period dividing rule;
selecting second license plates different from the first license plate in all the determined vehicle-passing records;
for each selected second license plate, determining a similarity between the second license plate and the first license plate; and
when there is a similarity greater than a third preset threshold, determining that the first license plate is inaccurately recognized.

7. The method according to claim 2, wherein, determining whether the first license plate is accurately recognized according to a preset rule comprises:
obtaining a stored historical first vehicle-passing record of the first license plate;
determining whether the first vehicle-passing record for the first license plate matches the historical first vehicle-passing record;
if the first vehicle-passing record for the first license plate does not match the historical first vehicle-passing record, determining that the first license plate is inaccurately recognized.

8. The method according to claim 7, wherein determining whether the first vehicle-passing record for the first license plate matches the historical first vehicle-passing record comprises:
determining whether a shape feature of a vehicle contained in the first vehicle-passing record for the first license plate is consistent with a shape feature of a vehicle contained in the historical first vehicle-passing record; and if the shape feature of the vehicle contained in the first vehicle-passing record is not consistent with the shape feature of the vehicle contained in the historical first vehicle-passing record, determining that the first vehicle-passing record for the first license plate does not match the historical first vehicle-passing record;
and/or,
determining a first appearance time and a first appearance location of a vehicle contained in the first vehicle-passing record for the first license plate, and a second appearance time and a second appearance location of a vehicle contained in the historical first vehicle-passing record; determining a first time difference between the first appearance time and the second appearance time, and a first distance difference between the first appearance location and the second appearance location; determining whether the quotient of dividing the first distance difference by the first time difference is within a preset interval; and if the quotient is not within the preset interval, determining that the first vehicle-passing record for the first license plate does not match the historical first vehicle-passing record.

9. The method according to claim 1, wherein determining at least one similar license plate of the to-be-corrected license plate according to stored vehicle-passing records comprises:
determining a first shape feature contained in the to-be-corrected vehicle-passing record;
determining second shape features contained in stored vehicle-passing records other than the to-be-corrected vehicle-passing record;
searching for a target second shape feature that is identical with the first shape feature in the determined second shape features; and
determining a license plate corresponding to the found target second shape feature as a similar license plate of the to-be-corrected license plate.

10. The method according to claim 1, wherein determining at least one similar license plate of the to-be-corrected license plate according to stored vehicle-passing records comprises:
determining a first appearance time and a first appearance location of a vehicle contained in the to-be-corrected vehicle-passing record;
determining, according to a preset second time period dividing rule, a second time period corresponding to the first appearance time; determining, according to a preset first area dividing rule, a first target area corresponding to the first appearance location; wherein the first area dividing rule is set according to the second time period dividing rule;
determining, in the stored vehicle-passing records, all vehicle-passing records during the second time period in the first target area;
selecting second license plates different from the to-be-corrected license plate in all the vehicle-passing records; and
determining, for each of the second license plates, a similarity between this second license plate and the to-be-corrected license plate, and if the similarity is greater than a third preset threshold, determining this second license plate as a similar license plate of the to-be-corrected license plate.

11. The method according to claim 1, wherein for each similar license plate, determining a to-be-matched vehicle-passing record for the similar license plate comprises:
determining a third appearance time and a third appearance location of a vehicle contained in the to-be-corrected vehicle-passing record;
determining, according to a preset third time period dividing rule, a third time period corresponding to the third appearance time;
determining, according to a preset second area dividing rule, a second target area corresponding to the third appearance location; wherein the second area dividing rule is set according to the third time period dividing rule; and
for each similar license plate, determining a historical vehicle-passing record of the similar license plate during the third time period in the second target area as the to-be-matched vehicle-passing record for the similar license plate.

12. The method according to claim 11, wherein there are at least two to-be-matched vehicle-passing records for each similar license plate; the step of matching the to-be-matched vehicle-passing record with the to-be-corrected vehicle-passing record and determining a matching probability between the similar license plate and the to-be-corrected license plate according to a matching result comprises:
determining a fourth appearance time and a fourth appearance location of a vehicle contained in each to-be-matched vehicle-passing record for the similar license plate;
determining a trajectory corresponding to the similar license plate according to the fourth appearance time and the fourth appearance location of the vehicle contained in each to-be-matched vehicle-passing record;
matching the third appearance time and the third appearance location with the trajectory, and determining a matching probability between the similar license plate and the to-be-corrected license plate according to a matching result.

13. The method according to claim 11, wherein, matching the to-be-matched vehicle-passing record with the to-be-corrected vehicle-passing record and determining a matching probability between the similar license plate and the to-be-corrected license plate according to a matching result comprises:
determining a fourth appearance time and a fourth appearance location of a vehicle contained in each to-be-matched vehicle-passing record for the similar license plate;
calculating, for each to-be-matched vehicle-passing record, a second time difference between the fourth appearance time contained in the to-be-matched vehicle-passing record and the third appearance time, and a second distance difference between the fourth appearance location contained in the to-be-matched vehicle-passing record and the third appearance location; determining, according to the second time difference and the second distance difference, a matching result of the to-be-matched vehicle-passing record and the to-be-corrected vehicle-passing record; and
determining a matching probability between the similar license plate and the to-be-corrected license plate according to the matching result of each to-be-matched vehicle-passing record for the similar license plate and the to-be-corrected vehicle-passing record.

14. The method according to claim 11, wherein matching the to-be-matched vehicle-passing record with the to-be-corrected vehicle-passing record and determining a matching probability between the similar license plate and the to-be-corrected license plate according to a matching result comprises:
determining a fourth appearance time and a fourth appearance location of a vehicle contained in each to-be-matched vehicle-passing record for the similar license plate;
calculating, for each to-be-matched vehicle-passing record, a second time difference between the fourth appearance time contained in the to-be-matched vehicle-passing record and the third appearance time; obtaining travel duration data of a vehicle between the fourth appearance location and the third appearance location in historical data; determining a duration probability corresponding to the second time difference according to the obtained travel duration data; determining a matching result of the to-be-matched vehicle-passing record and the to-be-corrected vehicle-passing record according to the duration probability; and determining a matching probability between the similar license plate and the to-be-corrected license plate according to the matching result of each to-be-matched vehicle-passing record for the similar license plate and the to-be-corrected vehicle-passing record.

15. A non-transitory computer readable storage medium storing an executable program code which, when executed, performs the license plate correction method according to claim 1.

16. An electronic device, comprising: a processor and a memory, wherein the memory is used to store an executable program code, and the processor executes a program corresponding to the executable program code by reading the executable program code stored in the memory, so as to perform operations of:
   determining a to-be-corrected license plate and a to-be-corrected vehicle-passing record for the to-be-corrected license plate, wherein the to-be-corrected license plate is a license plate that is not accurately recognized;
   determining at least one similar license plate of the to-be-corrected license plate according to stored vehicle-passing records;
   for each similar license plate, determining a to-be-matched vehicle-passing record for the similar license plate, matching the to-be-matched vehicle-passing record with the to-be-corrected vehicle-passing record, and determining a matching probability between the similar license plate and the to-be-corrected license plate according to a matching result; and
   determining a similar license plate as a corrected license plate, wherein the matching probability between this similar license plate and the to-be-corrected license plate is highest.

17. The electronic device according to claim 16, wherein the processor is further caused to perform operations of:
   obtaining recognized first license plates and first vehicle-passing records for the recognized first license plates;
   for each first license plate, determining whether the first license plate is accurately recognized according to a preset rule; and
   if not, determining the first license plate as the to-be-corrected license plate, and determining the first vehicle-passing record for the first license plate as the to-be-corrected vehicle-passing record.

18. The electronic device according to claim 17, wherein the processor is further caused to perform an operation of:
   determining whether the first license plate is accurately recognized by at least one of:
   a first determination method: determining whether the first license plate meets a preset naming rule; if the first license plate does not meet the preset naming rule, determining that the first license plate is inaccurately recognized;
   a second determination method: determining whether the first license plate comprises an indeterminate character, wherein a recognition result corresponding to the indeterminate character comprises at least two candidate characters, and the difference between the probabilities corresponding to the at least two candidate characters is less than a first preset threshold; if the first license plate comprises the indeterminate character, determining that the first license plate is inaccurately recognized; and
   a third determination method: determining a vehicle type corresponding to the first license plate; determining whether the determined vehicle type is consistent with a vehicle type contained in the first vehicle-passing record for the first license plate; if the determined vehicle type is not consistent with the vehicle type contained in the first vehicle-passing record for the first license plate, determining that the first license plate is inaccurately recognized.

19. The electronic device according to claim 17, wherein the processor is further caused to perform operations of:
   determining a first appearance time and a first appearance location of a vehicle contained in the first vehicle-passing record for the first license plate;
   determining, according to a preset first time period dividing rule, a first time period corresponding to the first appearance time;
   counting the number of historical first vehicle-passing records of the first license plate during the first time period;
   determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all second vehicle-passing records during the second time period in the first target area; wherein second license plates for the second vehicle-passing records are different from the first license plate, and the first area dividing rule is set according to the second time period dividing rule;
   determining, for each of the determined second vehicle-passing records, a similarity between a second license plate for the second vehicle-passing record and the first license plate; and
   when there is a similarity greater than a third preset threshold, determining that the first license plate is inaccurately recognized.

20. The electronic device according to claim 17, wherein the processor is further caused to perform operations of:
   determining a first appearance time and a first appearance location of a vehicle contained in the first vehicle-passing record for the first license plate;
   determining, according to a preset first time period dividing rule, a first time period corresponding to the first appearance time;
   counting the number of historical first vehicle-passing records of the first license plate during the first time period;
   determining whether the number of historical first vehicle-passing records is less than a second preset threshold; if the number is less than the second preset threshold, determining a second time period corresponding to the first appearance time according to a preset second time period dividing rule; determining a first target area corresponding to the first appearance location according to a preset first area dividing rule; determining all vehicle-passing records during the second time period in the first target area; wherein the first area dividing rule is set according to the second time period dividing rule;
   selecting second license plates different from the first license plate in all the determined vehicle-passing records;

for each selected second license plate, determining a similarity between the second license plate and the first license plate; and when there is a similarity greater than a third preset threshold, determining that the first license plate is inaccurately recognized.

* * * * *